(12) United States Patent
Pal

(10) Patent No.: US 6,717,300 B2
(45) Date of Patent: Apr. 6, 2004

(54) ARRANGEMENT FOR USING INDUCTION MOTOR AS A SENSOR TO SENSE ITS OWN ROTATION WHEN ELECTRICAL POWER IS NOT BEING SUPPLIED TO IT

(76) Inventor: Anadish Kumar Pal, 194 Vaishali Pitampura, Delhi 110088 (IN)

( * ) Notice: Subject to any disclaimer, the term of this patent is extended or adjusted under 35 U.S.C. 154(b) by 0 days.

(21) Appl. No.: 09/933,542

(22) Filed: Aug. 21, 2001

(65) Prior Publication Data

US 2002/0047350 A1 Apr. 25, 2002

Related U.S. Application Data

(60) Provisional application No. 60/220,441, filed on Jul. 24, 2000.

(51) Int. Cl.$^7$ ................................................. H02K 11/00
(52) U.S. Cl. ..................................... 310/68 B; 318/254
(58) Field of Search ......................... 310/68 B; 318/254

(56) References Cited

U.S. PATENT DOCUMENTS

| 4,054,943 | A | * | 10/1977 | Mundt | 318/701 |
| 4,888,533 | A | * | 12/1989 | Gotoh et al. | 318/524 |
| 5,793,169 | A | * | 8/1998 | De Filippis et al. | 318/254 |
| 6,107,762 | A | * | 8/2000 | Schauer | 318/245 |
| 6,184,604 | B1 | * | 2/2001 | Takano et al. | 310/77 |
| 6,236,179 | B1 | * | 5/2001 | Lawler et al. | 318/439 |

FOREIGN PATENT DOCUMENTS

| JP | 4359691 A | * | 12/1992 | |
| JP | 1189274 A | * | 3/1999 | |
| JP | 2001258283 A | * | 9/2001 | |
| WO | WO 8911523 A2 | * | 11/1989 | C11D/1/66 |

* cited by examiner

Primary Examiner—Joseph Waks

(57) ABSTRACT

A method of determining an angular movement of an induction motor involving steps of using the hardware of the induction motor as a low-power alternator producing alternating-current output with a frequency and voltage proportional to the rpm of the induction motor during the periods of planned or accidental interruption of electric power supply to the motor by utilizing the property of the induction motor acting as a low-power alternator due to the residual magnetism in the ferromagnetic circuit of the motor's squirrel-cage rotor. The method includes providing a set of electromagnetically operated changeover switches so that the low-power signal from the induction motor does not sink in the low impedance of the mains power. The method allows to detect the angular movement of the induction motor coming to a standstill after power outage, or motor rotation due to an external mechanical force exerted on the rotor, thus employing the induction motor, when it is not supplied with electrical power, as a tachogenerator to sense a movement of the machine, such as a machine tool for example, to which it is mechanically linked.

1 Claim, 1 Drawing Sheet

ARRANGEMENT FOR USING INDUCTION MOTOR AS A SENSOR TO SENSE ITS OWN ROTATION WHEN ELECTRICAL POWER IS NOT BEING SUPPLIED TO IT

CROSS-REFERENCE TO RELATED APPLICATIONS

This application claims the benefit of Provisional application Ser. No. 60/220,441, filed Jul. 24, 2000.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

There are various ways of sensing the rotation of an induction motor. Tachogenerators, resolvers and Hall-effect sensors are some of the conventional sensing devices. But all such sensing methods necessitate the use of additional hardware on the induction-motor frame itself. In many applications, where there are physical or cost constraints, it may not be possible to use additional sensing devices on the motor frame. When an induction motor is being driven by using a variable-speed drive, it is possible to define or estimate the angular movement of the rotor. But when the power to the drive is turned off, and the induction motor keeps rotating either due to its rotor's moment of inertia or due to some external mechanical force, it is not possible to sense the angular movement of the rotor of the induction motor without the use of an extra device coupled with the frame of the induction motor.

In many applications, it becomes essential to be able to detect the angular movement of the rotor of the induction motor after electrical power driving the motor has been switched off. Like in the case of the high-rpm induction motor driving high-speed grinding wheels resting on oil-fed hydrostatic bearings. At the time of sudden power outage, if the grinding wheels are rotating, it is essential to continue oil supply to the hydrostatic bearing. As there are physical constraints to introducing an additional conventional sensor in the above-mentioned example, a solution is needed to sense the angular movement of the driving induction motor's rotor. There are low-cost areas of application, like electrical saws and industrial blowers; where the easy sensing of rotation of the driving induction motor after electrical power to the motor is withdrawn can provide a safety interlock without any alteration in the mechanical construction of such equipment.

BRIEF SUMMARY OF THE INVENTION

The rotor of a common induction motor is in the form of multiple shorted secondary windings of a transformer. The electrical conductor is made either of aluminum or copper; the magnetic circuit comprises of silicon-steel stampings stacked together. When power is switched off to an induction motor, the residual magnetism of the silicon-steel stampings forms multiple poles on the angular face of the rotor. These multiple magnetic poles induce minute electrical current in the stator winding just like as it happens in a small alternator. The frequency of the output voltage generated in this manner is directly proportional to the angular velocity of the rotor of the induction motor. Contactors and relays are arranged in a manner so that this sensor voltage could be directed to an amplifier and/or counter to be able to draw inference from the sensor signal.

The absence of any external device on the induction motor makes this invention particularly easy to implement. Many a time it is physically impossible to accommodate any piece of hardware in and around an induction motor, in these circumstances the present invention could be of particular use. In addition, in applications where the motor is not powered and is rotating due to some other mechanical linkages, this invention could be used to detect that movement without putting any additional device on the motor— thus saving both cost and space.

This invention successfully solves the problem of detecting during a power outage the rotation of the rotor of the spindle-driving induction motor in a grinding machine with hydrostatic bearings supporting the spindle, which holds big grinding wheels. The impossibility of fitting an extra sensor in the extremely harsh conditions near the grinding wheels means having a sensor on the spindle-driving induction motor, which is physically very difficult. Any alteration in the mechanical mounting of the spindle-driving induction motor could disturb the mechanical alignment, which is absolutely necessary for a satisfactory operation of the grinding machine. This invention obviates the need to even touch the mechanical parts of the grinding machine and solves the problem by using the spindle-driving induction motor as a sensor to detect its own rotation during a power outage to be able to give command to a battery-powered inverter to commence electrical supply to the oil-pump motor supplying oil to the very expensive and critical hydrostatic bearings supporting the spindle.

DETAILED DESCRIPTION OF THE INVENTION

Figure 1:
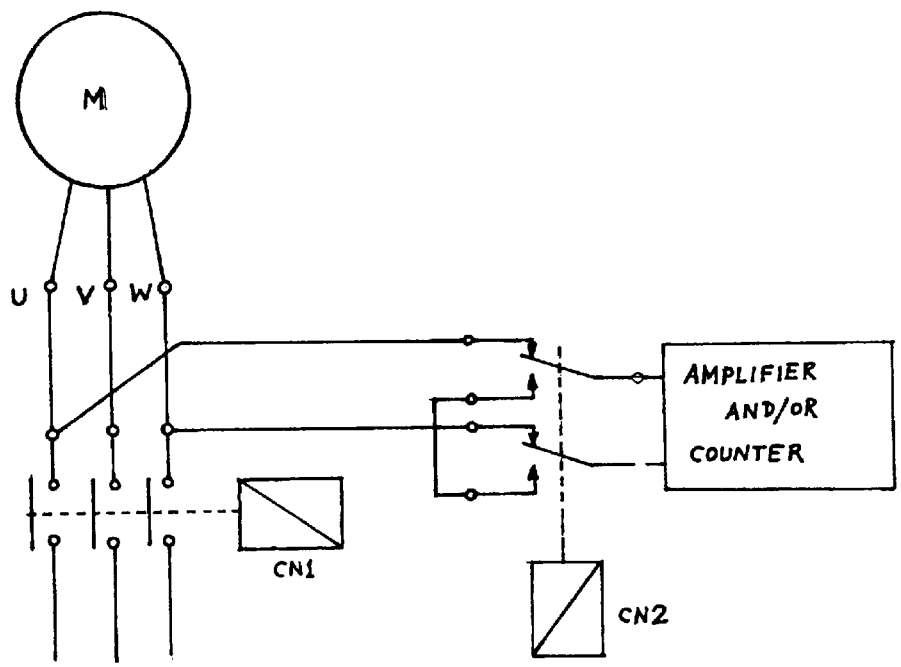
FIG. 1 is an electrical circuit diagram showing the arrangement described in the description of the invention.

In most of the general-purpose induction motors, the rotor is of squirrel-cage construction, where the shorted secondary windings of the induction motor are placed. The primary winding generally is on the stator. The magnetic circuit of the induction motor consists of silicon-steel stampings stacked together to reduce eddy-current losses in the magnetic circuit. After an induction motor is switched off from the mains supply, theoretically, the residual magnetism of the ferro-magnetic circuit tends to be zero. Still, little bit of residual magnetism remains in the rotor as well as the stator. Weak but distinct permanent magnets formed on the rotor make the induction motor rotating without electrical driving power function as an alternator producing weak but distinct electrical waves. Till now, this miniscule signal either used to get sunk in the mains power lines, or went unused, in the absence of a scheme to utilize it. The voltage and the frequency of this tachogenerator signal is proportional to the rpm of the induction motor running due to its moment of inertia in the absence of any external electrical driving power. Gradually the rotor of the induction motor comes to a halt. With this the signal coming out of the stator winding stops. Generally, the ring value of this signal voltage is between 30 and 0.1 Volts for practical sensing applications to be successfully implemented. At voltage levels below 0.1 Volt, the noise voltages interfere, and discrimination of the signal deteriorates. In the case of a three-phase induction motor, mostly, there is a contactor in series with the mains supply to turn the induction motor on and off. Even when the induction motor is being driven by a variable-speed drive, usually there is a three-pole contactor in conjunction with an over-current relay to turn off the induction motor in case of emergencies. This contactor (CN 1 in FIG. 1) in series with the mains supply to the three inputs U, V and W (FIG. 1) disconnects the motor from the mains supply as soon as the mains power is disconnected or turns off. At this instant, two connections to any two of the three inputs U, V and W (FIG. 1) going through two independent, normally closed contacts of a relay or a contactor reach the tachogenerator signal from the induction motor acting as a residual-magnet alternator to an amplifier and/or counter. This two-pole, double-throw contactor or relay (CN 2) is of much lower current rating than the main motor-control contactor CN 1 in FIG. 1. CN 2 and CN 1 could be driven by any logical signal or directly by the mains supply.

Due to high moment of inertia, in certain cases, an induction motor connected to a flywheel load like a high-speed grinding-wheel stack keeps rotating for nearly 10 minutes before stopping fully. In this case, the self-generated tachogenerator signal from the induction motor would be available throughout those 10 minutes after a mains power failure. The amplifier and/or counter for this tachogenerator signal would need a power source in the form of a rechargeable battery or a high-value capacitor.

In some applications—as was the case of providing starting trigger voltage to a battery-powered, three-phase inverter—the self-generated tachogenerator signal can be directly applied after simple full-wave rectification utilizing a bridge rectifier. In such applications, the battery-driven inverter or the UPS runs for a preset time after receiving a start signal from the self-generated tachogenerator output of the induction motor whose angular movement was to be detected.

In the application of this invention, it is important that three-core or twin-core shielded cable is used to wire CN 1 to the motor M (in FIG. 1). Number of cores in the shielded cable depends upon whether the motor in question is a single-phase or three-phase one. The external shield of the cable has to be grounded, preferably, on both the ends.

When an amplifier and/or counter is used to process the self-generated tachogenerator signal from the application motor, it is important to have an over-voltage protection circuit at the front end of the amplifier and/or counter module. This would prevent the amplifier from getting damaged if the relay contacts of CN 2 (FIG. 1) got stuck; in that case, full supply voltage would appear on the input of the amplifier and/or counter.

The windings of most of the induction motors are of fairly low impedance. This improves the signal-to-noise ratio of the self-generated tachogenerator signal coming out of the motor stator windings. Furthermore, induction motor housings are electrically and magnetically fully shielded; which prevents external sources of noise from breaking in. The robustness of construction, low source impedance and ease of use make this self-generated tachogenerator output from any induction motor a more suitable solution in some mains hold-up or power-off applications compared to the use of an additional sensor with the induction motor to detect the angular movement of the rotor of the motor.

In another addition to the application, CN 2 in FIG. 1 could be of 3-pole type. The three-phase self-generated tachogenerator output is sent to a phase discriminating amplifier to detect the phase relationship between the three signal phases. This will logically indicate the direction of rotation of the rotor of the induction motor.

In comparatively smaller-capacity induction motors, the use of CN 2 could be avoided by using CN 1 contactor with auxiliary normally closed contacts. In large contactors, auxiliary contacts would gradually get deposited with residues left out of the repeated arcing taking place during the make-and-break operation of main contacts.

What is claimed is:

1. An arrangement for using a single-phase or three-phase induction motor as a sensor to sense mechanical rotations of said induction motor's rotor by utilizing a low-power alternating current generated in the stator winding or windings of said induction motor by mechanical rotation of the rotor of said induction motor at the time when said induction motor is completely disconnected from an electrical power supply, for the purpose of a process control and/or display of rotations of said rotor comprising:

said single-phase or three-phase induction motor;

two sets of electromagnetically operated switches;

wherein first set of said electromagnetically operated switches comprises at least one set of contacts in case of said induction motor being a single-phase motor, or at least two sets of contacts in case of said induction motor being a three-phase motor, wherein said first set of switches opens a low-impedance path for the low-power alternating current, generated by the mechanical rotation of said rotor in the absence of said electrical power supply, to the source of said electrical power;

the second set of electromagnetically operated switches comprising at least one set of contacts which closes in the event said first set of electromagnetically operated switches having opened due to an electrical command or due to an electrical power outage, thus allowing for routing of said low-power alternating current generated by said induction motor as a signal to said process control, and an alarm or display.

* * * * *